US 6,694,258 B2

(12) United States Patent
Johnson et al.

(10) Patent No.: US 6,694,258 B2
(45) Date of Patent: Feb. 17, 2004

(54) HAND HELD CAR LOCATOR

(75) Inventors: Susan Johnson, Rochester, MI (US); Tejas Desai, Sterling Heights, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 290 days.

(21) Appl. No.: 09/953,764

(22) Filed: Sep. 17, 2001

(65) Prior Publication Data

US 2003/0197640 A9 Oct. 23, 2003

Related U.S. Application Data

(63) Continuation of application No. 09/572,923, filed on May 16, 2000, now Pat. No. 6,392,592.
(60) Provisional application No. 60/157,176, filed on Sep. 30, 1999.

(51) Int. Cl.[7] .............................................. G01C 21/00
(52) U.S. Cl. ................. 701/213; 701/116; 342/357.09; 342/357.07; 342/357.13; 340/10.6; 340/505; 340/995.28; 340/989; 340/932.2
(58) Field of Search ................................ 701/200–215, 701/216, 1; 340/10.6, 505, 995.28, 989, 10.51, 988, 932.2; 455/517, 456.1; 342/357.07, 357.13, 357.09

(56) References Cited

U.S. PATENT DOCUMENTS

| | | | | |
|---|---|---|---|---|
| 5,786,758 A | * | 7/1998 | Bullock | 340/539 |
| 5,926,752 A | * | 7/1999 | Lin | 455/323 |
| 6,025,786 A | * | 2/2000 | Rayford | 340/825.31 |
| 6,201,498 B1 | * | 3/2001 | Fan | 342/357.09 |
| 6,226,510 B1 | * | 5/2001 | Boiling et al. | 455/404 |

FOREIGN PATENT DOCUMENTS

| | | |
|---|---|---|
| DE | 4238301 | 5/1994 |
| DE | WO0034933 A | 6/2000 |
| GB | 0350554 | 1/1990 |
| JP | 06097863 | 4/1994 |
| JP | 10318763 | 12/1998 |

OTHER PUBLICATIONS

European Search Report, Oct. 27, 2000.

* cited by examiner

Primary Examiner—Thomas G. Black
Assistant Examiner—Ronnie Mancho

(57) ABSTRACT

A car locator system includes a hand held locator which receives information with regard to the location of a vehicle and then stores that information for display on the hand held locator. The hand held locator could be a key fob having buttons to command operation to the vehicle. When a command signal is transmitted to the vehicle, the vehicle then transmits its position location to the hand held location for storage. In this way, an operator will be able to have an indication of the location of the vehicle. The vehicle can communicate with GPS satellites to determine its location, or may communicate with ground based local transmitters. The ground based local transmitters can be programmed to provide an indication of the location of the vehicle within a parking lot.

15 Claims, 2 Drawing Sheets

HAND HELD CAR LOCATOR

This application is a continuation of Ser. No. 09/572,923 filed May 16, 2000, now U.S. Pat. No. 6,392,592 which claimed priority to Provisional Application Ser. No. 60/157,176, filed Sep. 30, 1999.

BACKGROUND OF THE INVENTION

This invention relates to a system wherein a car position is transmitted to a hand held locator, such that the operator will be able to more easily find a vehicle when parked. Modern vehicles are provided with a number of electronic features. As one example, many modern vehicles are provided with a GPS navigation system which provides some information with regard to approximate location of the vehicle. This information can provide an approximate address for a location of the vehicle.

Further, most vehicles are provided with hand held key fobs which include a number of electronic commands for the vehicle. As an example, the key fob will command the vehicle doors to lock and unlock.

One deficiency with modern vehicles, is there has been no practical way of storing the location of a vehicle when parked in a large parking area. As an example, when a vehicle is parked in a large parking lot, there is no practical way of providing information to the vehicle operator of where the vehicle is parked. Similarly, if parked on a city street, there has been no simple way of providing the operator with feedback of where the vehicle was parked.

SUMMARY OF THE INVENTION

In a disclosed embodiment of this invention, information with regard to the location of a vehicle is transmitted to a hand held locator when the vehicle is parked. As one example, the hand held locator may be a key fob; however, other hand held devices may be provided with this function. In one embodiment, when the key fob is actuated to lock the vehicle doors, the vehicle sends a signal to the key fob of the location of the vehicle. In one simple embodiment, the information transmitted to the key fob may be GPS navigation system information. This information will prove sufficient if the vehicle is parked on a city street, as the information should provide accurate information of approximate address. However, with modern GPS navigation systems, there is no reference point in a large potential parking area such as a parking lot.

Thus, in a second embodiment of this invention, localized position locating transmitter may be positioned at locations around a city, or in a particular parking area. Those local positioning transmitters will provide the vehicle with an indication of its location within a parking lot, or other potential large parking area. Then, when the position information is transmitted to the hand held locator, it is this localized information which is downloaded to the hand held locator. The technology utilized to receive, interpret and then transmit this information can be similar to that utilized for GPS navigation systems. Further, the technology necessary to provide these local transmitters is also within the skill of a worker in this art. It is the application of such a system which is inventive here.

Further, as GPS databases increase in detail, it may well be that they will be able to provide information on particular parking lot locations. Further, the local transmitter such as mentioned above could be a local GPS correction device. GPS systems are known which have reference points located around a particular area. The reference points allow a GPS navigation system to pinpoint the reference points, and thus adjust the location of the vehicle by working from the known reference point. This feature, and in particular in combination with increased detail in the databases, will provide the ability to display specific information about the location in a parking lot.

These and other features of the present invention can be best understood from the following specification and drawings, the following of which is a brief description.

DETAILED DESCRIPTION OF A PREFERRED EMBODIMENT

Figure 1:
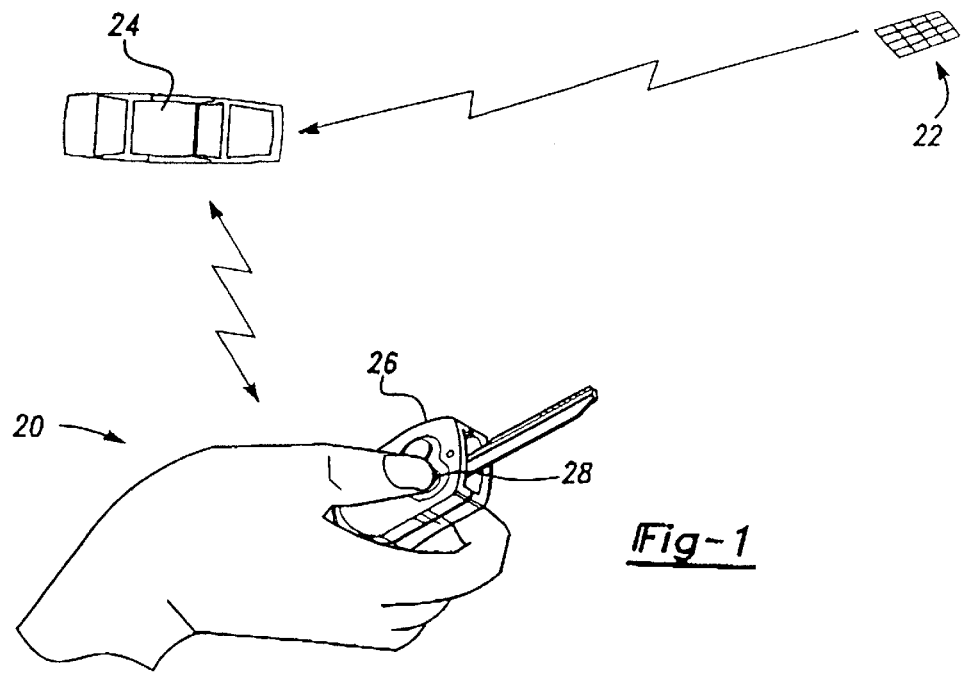
FIG. 1 is a schematic view of a first embodiment of this invention.

A vehicle locator system 20 is illustrated in FIG. 1 receiving information from a GPS satellite 22. The vehicle 24 is shown parked. The satellite 22 will communicate with the vehicle such that the vehicle 24 can interpret the satellite signal and determine its approximate location. Then, a hand held locator 26 is actuated by the user by pushing a button 28, the vehicle 24 sends its position information to the hand held locator 26. The locator 26 preferably has an RF/LF transmitter receiver to communicate as described in this application. In a preferred embodiment, the hand held locator is a key fob, and the button 28 is the door lock function. The locator 26 is modified to have an appropriate memory to store this information. Thus, when the operator actuates the door lock function, the vehicle 24 sends a signal to the key fob 26 of where the vehicle is located. As an alternative, any other signal indicative of the vehicle being locked would be utilized. As an example, the actuation of the sending of the signal to the key fob could occur entirely at the vehicle without any signal from the key fob. As an example, if the doors are locked at the vehicle is turned off, the signal may be sent. Thus, the signal could be generated upon the locking of the door, rather than upon the receipt of a signal from the key fob. The above described system has two potential deficiencies. First, while the accuracy of GPS navigation systems are being continuously improved, they are still somewhat inaccurate within a degree of several yards. Moreover, the GPS navigation systems provide address information with regard to streets. Such information is not very valuable within a large parking lot.

Figure 2:
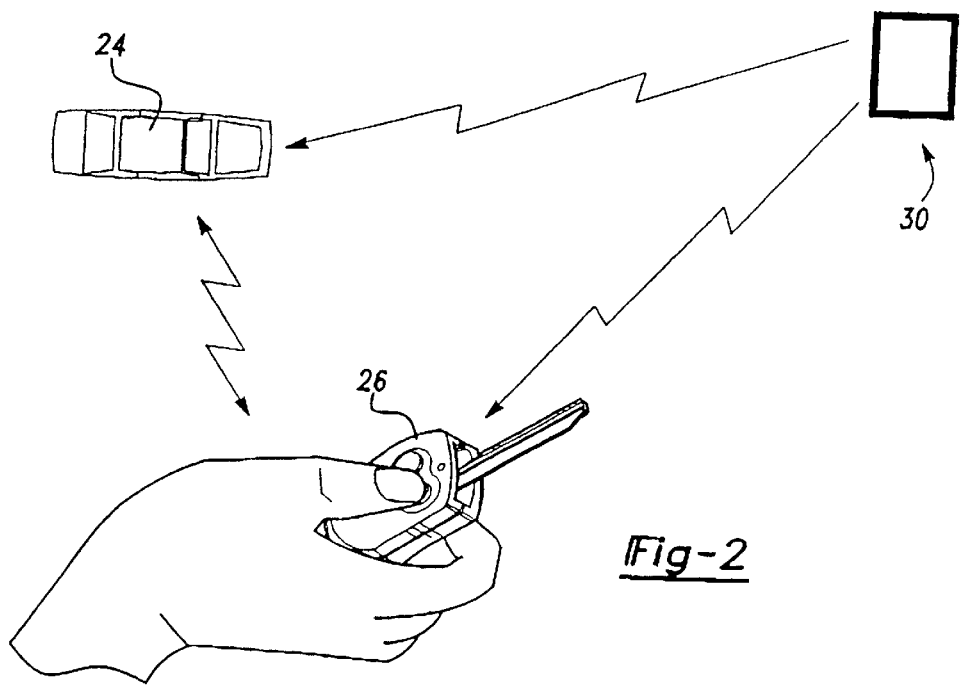
FIG. 2 is a schematic view of the second embodiment.

Thus, as shown in FIG. 2, local transmitters 30 can be utilized to communicate with the vehicle 24. Again, the vehicle 24 is provided with a receiver to receive the information, which may be essentially identical to its normal GPS receiver. The local transmitter 30 provides information with regard to a location in a parking lot, or more accurate information with regard to a position on a city street. Local transmitters 30 thus allow the vehicle 24 to communicate with the key fob 26 and provide very accurate information of the location of a vehicle, including its position within a parking lot. Alternatively, transmitter 30 can supply information directly to the locator 26. If the download occurs at the time the vehicle is locked, then the transmitter storing the locator information on the locator would put the operator very close to the vehicle.

The FIG. 2 embodiment is also representative of a modified GPS locator system. In this embodiment, the members

30 could be GPS reference points. It is known that GPS reference points are located at certain locations to allow a GPS navigation system to focus its position to a more exact location. Such information combined with an increase in detail in the GPS database will allow the identification of a particular location in a large parking lot, etc. Thus, the FIG. 2 embodiment could also extend to such an arrangement.

Figure 3:
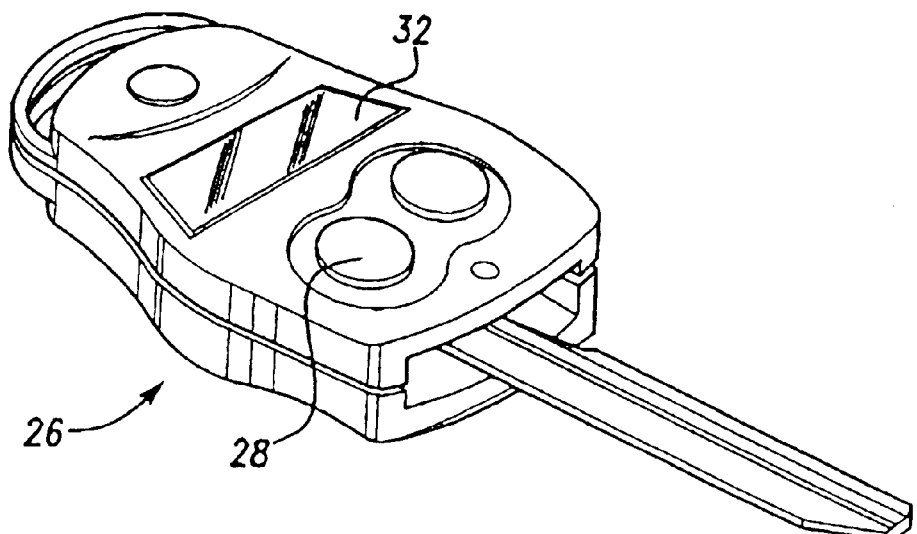
FIG. 3 is a plan view of an inventive key.

FIG. 3 shows the key fob 26 having its switch 28, and a display screen 32 for displaying the location of a vehicle.

Figure 4:
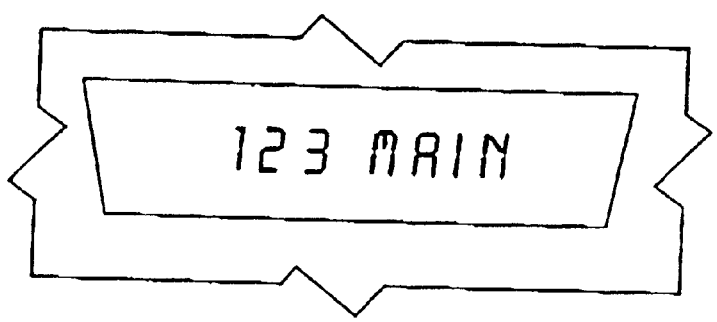
FIG. 4 is a view of a first display embodiment.

As shown in FIG. 4, in a first embodiment, the display could simply display address information. The embodiment of FIG. 1 would be capable of providing such a display function.

Figure 5:
FIG. 5 is a view of a second display embodiment.

It may also be that the standard GPS navigation systems will be improved such that location within a parking lot will also be part of a standard GPS navigation system. If such development occurs, then the embodiment of FIG. 1 will also provide information of the location within a parking lot, such as shown in FIG. 5.

Also, the FIG. 2 embodiment would provide information of the location within a parking lot, if properly programmed.

Essentially, the present invention allows a hand held locator to be provided with location information from a vehicle when the operator exits the vehicle. In this way, the operator is reminded of the location of the vehicle, and will be able to find the vehicle. The technology necessary for this invention is well within the skill of a worker within the art. It is the application of the technology to the particular problem which is inventive here.

Although preferred embodiments of this invention have been disclosed, a worker in this art would recognize that certain modifications would come within the scope of this invention. For that reason, the following claims should be studied to determine the true scope and content of this invention.

What is claimed is:

1. A method of providing an indication of a location of a vehicle when parked comprising the steps of:

(1) determining the location of a vehicle;

(2) transmitting the location information to a hand held locator; and (3) storing said information in said hand held locator for later retrieval; and (4) displaying said actual location information on said hand held locator, wherein the hand held locator is a key fob for sending commands to the vehicle, and the transmission of the vehicle location to the hand held locator occurs when a signal is sent from the key fob to the vehicle.

2. A method as recited in claim 1, wherein a GPS satellite provides information to the vehicle of its location which is then transmitted to the hand held locator.

3. A method as recited in claim 1, wherein a local ground based transmitter provides vehicle location information of the vehicle, and the vehicle then transmits that information to the hand held locator.

4. A method as recited in claim 1, wherein the local transmitter transmits a location directly to the hand held locator.

5. A method as set forth in claim 1, wherein said signal is a command to the vehicle from the key fob.

6. A method as set forth in claim 1, wherein the transmitting of step 2 occurs passively when an event occurs at the vehicle.

7. A method as set forth in claim 6, wherein said event is the locking of the vehicle doors.

8. A hand held locator comprising:

a receiver for receiving location information with regard to the actual location of a vehicle; and a memory for storing said received actual location information, and a display for displaying said stored received actual location information, wherein said key fob includes a door lock button, and actuation of said button initiates the transmission of a vehicle location information to said key fob for storage.

9. A locator as set forth in claim 8, wherein said hand held locator is a key fob including buttons for commanding instruction to the vehicle.

10. A system for identifying the location of a vehicle comprising:

a position transmitter for transmitting actual location information to a hand held locator with regard to the actual location of a vehicle; and a hand held locator for receiving said actual information, storing said actual location information, and for displaying said stored actual location information, wherein said position transmitter transmitting location to a hand held locator passively when an event occurs at said vehicle, wherein said event is the locking of the vehicle doors.

11. A system as set forth in claim 10, wherein a GPS satellite transmits vehicle location to said vehicle.

12. A system as set forth in claim 11, wherein said position transmitter is a ground based local transmitter transmitting information to said hand held locator.

13. A system as set forth in claim 12, wherein said local transmitter includes information with regard to a position in a large parking lot.

14. A system as set forth in claim 10, wherein a local transmitter transmits a location signal to a vehicle, said vehicle including a receiver for receiving said location signal, and further including a transmitter for transmitting said information to said hand held locator.

15. A system as set forth in claim 10, wherein said hand held locator is a key fob having buttons for commanding action of said vehicle.

* * * * *